Feb. 24, 1925.

T. J. PHELAN

NUT LOCK

Filed Aug. 5, 1924

1,527,915

Thomas J. Phelan
INVENTOR.
BY
ATTORNEY.

Patented Feb. 24, 1925.

1,527,915

UNITED STATES PATENT OFFICE.

THOMAS J. PHELAN, OF BLACK LICK, PENNSYLVANIA.

NUT LOCK.

Application filed August 5, 1924. Serial No. 730,187.

*To all whom it may concern:*

Be it known that THOMAS J. PHELAN, a citizen of the United States of America, residing at Black Lick, in the county of Indiana and State of Pennsylvania, has invented certain new and useful Improvements in Nut Locks, of which the following is a specification.

This invention relates to a nut lock. The principal object of this invention is to provide a nut which may be used on any ordinary threaded bolt, and which will hold the nut in a fixed relation to the bolt. One of the great troubles in using ordinary nuts for bolts, is that the same will become loosened due to strain, jar or stress which is ordinarily given to nuts.

The drawing illustrates the preferred embodiment of the invention, however, it is to be understood that in adapting the same to meet different conditions, various changes in the form and minor details of construction may be resorted to without departing from the nature of the invention, as claimed and set forth in the drawing:—

Figure 1:
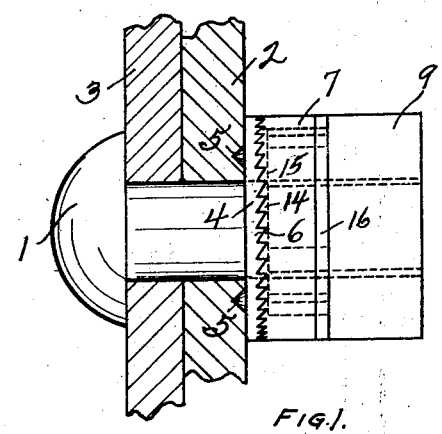
Figure 1 is a horizontal view of a bolt passing through parts to be bolted with improved nut in position on bolt.
Figure 2:
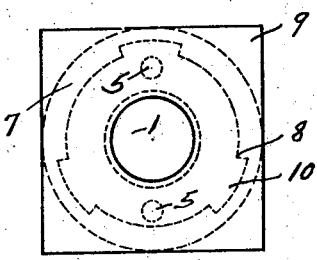
Figure 2 is an end view of Figure 1.
Figure 3:
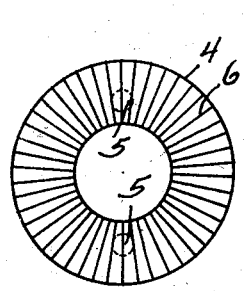
Figure 3 is a top plan view of a washer portion of lock nut.
Figure 4:
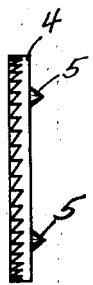
Figure 4 is a side view of Figure 3.
Figure 5:
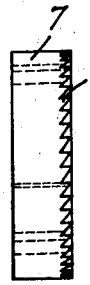
Figure 5 is a side view of a sleeve member.
Figure 6:
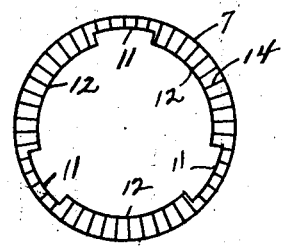
Figure 6 is a top plan view of a sleeve member.
Figure 7:
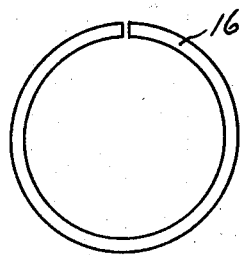
Figure 7 is a top plan view of a snap ring member.
Figure 8:
Figure 8 is a side view of Figure 7.

By referring to Figure 1, it will be seen that an ordinary bolt 1, passes through any ordinary material 2 and 3, to be bolted together. The lock nut is placed upon the bolt 1, and assembled in the following manner:—

The washer portion 4 is placed over the end of the bolt 1. This washer portion 4 is provided with points 5 upon one side to function with material 2 in order to keep the same from rotating. This washer portion 4 is provided with teeth 6. The sleeve member 7 is now slipped over the extension 8 of the nut 9.

Figure 9:
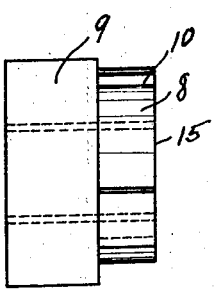
Figure 9 is a side view of the nut without locking parts.
Figure 10:
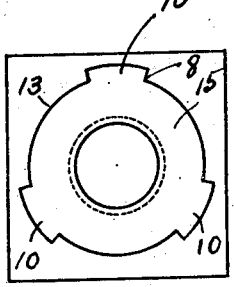
Figure 10 is a top plan view of Figure 9.

By referring to Figures 9 and 10, it will be seen that this extension 8 is provided with lugs 10. The interior of the sleeve member 7 is provided with recesses 11, fitting over the lugs 10 closely, so that the inner circumference 12 of the sleeve member 7 slides over the circumference 13 of the extension 8 of the nut 9. This sleeve member 7 is provided with teeth 14. The nut 9 with the sleeve member 7 is positioned over the extension 8, and is now turned down upon the bolt 1, so that an end 15 of the extension 8 comes in contact with the washer portion 4, forcing the points 5 into the material 2. As the sleeve member 7 is not as long as the extension 8 of the nut 9, the teeth 14 of the sleeve member 7 do not engage with the teeth 6 of the washer portion 4. In order to lock the nut, the sleeve member 7 is forced against the washer portion 4 so that the teeth 6 and 14 engage. In order to hold them in engaged relation, a snap ring 16 is snapped into position between the nut 9 and the sleeve member 7. This snap ring 16 is of a thickness, just sufficient to fill in this space when the teeth 14 are in engaged position with the teeth 6.

What I claim is:—

In a device of the class described, a nut provided with an extension, a plurality of lugs formed on said extension, a sleeve portion of less length than said extension functioning with said lugs, teeth on one end of said sleeve member, a washer portion provided with teeth on one side and points on its other side, a snap ring used to force and hold said sleeve member and washer portion in engaged teeth relation, substantially as described for the purpose set forth.

In testimony whereof I affix my signature.

THOMAS J. PHELAN.

Witnesses:
ALICE G. PAGE,
BERTHA A. STEWART.